3,144,304
PROCESS FOR PURIFYING ALUMINA AND RECOVERING A GALLIUM CONCENTRATE
Tadashi Nagumo and Masahiko Murakoshi, Tokyo, Japan, assignors to Asahi Kasei Kogyo Kabushiki Kaisha, Osaka, Japan, a corporation of Japan
No Drawing. Filed July 21, 1961, Ser. No. 125,646
Claims priority, application Japan Aug. 27, 1960
2 Claims. (Cl. 23—140)

This invention relates to a process for purifying crude alumina. More particularly this invention relates to a process for purifying crude alumina or aluminum hydroxide having been obtained by an alkali decomposition method and simultaneously recovering gallium therefrom.

With respect to the production of alumina, the alkali decomposition method has been considered as being most advantageous and it is now widely employed. However, the alumina obtained by this method contains sodium, iron, silica and other impurities and it is therefore unsuitable for use requiring high purity. Furthermore, alumina also contains gallium as one of its impurities, which is a very valuable metal. As will be understood by those skilled in the art, it is very desirable to develop a process for simultaneously effecting the purification of alumina as well as the recovery of gallium therefrom. It is thus one object of the present invention to provide such process.

Bayer's method or the alkali decomposition method consists of treatment with alkali. If aluminum hydroxide prepared by the Bayer's method is redecomposed with an acid, sodium and the like impurities, which are unavoidable when alkali decomposition method is used, would naturally be removed. In addition to this, as we have found, the purity of the purified alumina can be improved if the removal of iron, gallium or the like ion by solvent extraction or ion exchange is effected prior to separation of alumina or aluminium salt from the solution containing same. Such solvent extraction or ion exchange will serve not only to improve the purity of alumina but also to effect recovery of gallium.

In accordance with a process of the present invention, a solution obtained by redecomposing aluminum hydroxide with hydrochloric acid is subjected to anion exchange or solvent extraction with liquid amine, trialkyl phosphate, trialkyl phosphine oxide, dialkylalkyl phosphonic acid, alkyl-dialkyl phosphonic acid, methyl isobutyl ketone, etc., thereby gallium as well as iron and the like are separated from aluminum.

The thus obtained extract contains iron and other contaminants, but these contaminants can be readily removed.

The following examples will serve to show how the present invention is carried out into practice.

*Example 1*

The resultant aluminum hydroxide product from alkali decomposition method has the following composition:

| | Percent |
|---|---|
| $Al_2O_3$ | 60.850 |
| $SiO_2$ | 0.22 |
| $Fe_2O_3$ | 0.020 |
| $Na_2O$ | 0.196 |
| CaO | 0.163 |
| $TiO_2$ | 0.005 |
| $Ga_2O_3$ | 0.0088 |
| $H_2O$ | 38.60 |

One kilogram of the product is dissolved in 7.0 l. of concentrated hydrochloric acid by warming and then the resulting mixture is filtered. The filtrate is passed through an anion exchange resin (Amberlite IRA–400 a quaternary ammonium type of anionic exchange resin) layer of 3 cm. in diameter and 15 cm. in thickness. The thusly treated solution gives 3055 g. of precipitated aluminum trichloride hexahydrate ($AlCl_3 \cdot 6H_2O$) when it is contacted with a sufficient amount of hydrogen chloride gas to precipitate all the aluminum trichloride. The precipitate is heated at 350° C. for half an hour thereby yielding pure alumina which contains less than 0.001% respectively of $Na_2O$, CaO, $F_2eO_3$ and $SiO_2$ and does not contain $Ga_2O_3$.

The ion exchange resin is washed with 0.5 l. of 1:1 hydrochloric acid-water and then the adsorbed gallium, iron and other impurities are eluted with 1 l. of water. The aqueous layer is neutralized with ammonia in the presence of Methyl Red indicator, thereby to cause precipitation of gallium, iron and other impurities as the corresponding hydroxides. The resulting precipitate is washed several times with water to remove the major proportion of chlorine ion and then it is fired to produce 0.300 g. of mixed oxides, which contain 23.5% of $Ga_2O_3$.

*Example 2*

One kilogram of aluminum hydroxide used in Example 1 is decomposed in the same manner as in Example 1. The solution is filtered and then extracted with 3 l. of 20% tributyl phosphate (TBP)-kerosene solution to remove gallium, iron and other impurities. The solution is treated in the same manner as in Example 1 thereby to produce alumina. It contains less than 0.001% respectively of $Na_2O$, CaO and $SiO_2$, and no $Fe_2O_3$ and $Ga_2O_3$. The 20% TBP-kerosene solution is washed with 1 l. of 1:1 hydrochloric acid-water mixture and then gallium, iron and other impurities are eluted therefrom with 1 l. of water. The aqueous layer is treated in the same manner as in Example 1 thereby to produce 0.290 g., of mixed oxides which contain 24.7% of $Ga_2O_3$.

*Example 3*

One kilogram of aluminum hydroxide product used in Example 1 is decomposed under the same condition as that of Example 1. The resulting solution is extracted with 3 l. of 10% Amberlite LAI (a quaternary ammonium group, in a base or salt form, strongly basic crosslinked polystyrene divinyl benzene)-kerosene solution to remove gallium, iron and other impurities. The residual solution is treated in the same manner as in Example 1, thereby to produce purified alumina, which contains less than 0.001% respectively of $Na_2O$, CaO and $SiO_2$ and no $Fe_2O_3$ and $Ga_2O_3$. The 10% Amberlite LAI-kerosene extract is washed with 1 l. of 1:1 HCl-water and then back-extracted with 1 l. of water. The resulting aqueous layer is treated in the same manner as in Example 1 thereby to produce 0.289 g. of mixed oxides which contain 22.8% of $Ga_2O_3$.

What we claim is:
1. A process for simultaneously effecting purification of alumina and recovery of gallium, which comprises decomposing aluminum hydroxide with hydrochloric acid, said aluminum hydroxide being formed by hydrolyzing alkali aluminate solution obtained from the alkali decomposition of an aluminum-containing ore, passing the resulting solution through a strongly basic anion exchange resin layer having an affinity for gallium to adsorb gallium, iron and other metallic impurities, introducing into the thusly treated solution an amount of hydrogen chloride gas sufficient to form aluminum trichloride as a precipitate and firing the precipitate to form purified alumina, washing the resin layer with aqueous hydrochloric acid and then eluting the adsorbed gallium, iron and other impurities with water, neutralizing the resulting elution with ammonia to form a precipitate of gallium, iron and other metallic impurities as their hydroxides, and firing the hydroxides to form mixed oxides containing a substantial amount of gallium oxide.

2. A method as claimed in claim 1 comprising filtering the solution before the passage of the same through the anion exchange resin.

References Cited in the file of this patent

UNITED STATES PATENTS

| | | |
|---|---|---|
| 2,249,761 | Hixon et al. | July 22, 1941 |
| 2,376,696 | Hixon et al. | May 22, 1945 |
| 2,574,008 | Beja | Nov. 6, 1951 |
| 2,830,874 | Long et al. | Apr. 15, 1958 |
| 3,073,675 | Leum et al. | Jan. 15, 1963 |

OTHER REFERENCES

Hampel: Rare Metals Handbook, Reinhold Publishing Corp. New York, 1954, pages 148 to 152.